US012010077B1

United States Patent
Henry et al.

(10) Patent No.: US 12,010,077 B1
(45) Date of Patent: Jun. 11, 2024

(54) STATUS DETERMINATION OF ELECTRONIC TRANSACTIONS USING REDUCED MEMORY RESOURCES

(71) Applicant: Truist Bank, Charlotte, NC (US)

(72) Inventors: Kendra Henry, Charlotte, NC (US); Luana Peterman, Lancaster, SC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/063,713

(22) Filed: Dec. 9, 2022

(51) Int. Cl.
| | |
|---|---|
| *G06F 15/16* | (2006.01) |
| *G06Q 20/38* | (2012.01) |
| *G06Q 20/42* | (2012.01) |
| *H04L 51/04* | (2022.01) |
| *H04L 51/216* | (2022.01) |
| *H04L 51/224* | (2022.01) |

(52) U.S. Cl.
CPC ........... *H04L 51/04* (2013.01); *G06Q 20/389* (2013.01); *G06Q 20/42* (2013.01); *H04L 51/216* (2022.05); *H04L 51/224* (2022.05)

(58) Field of Classification Search
CPC ..... H04L 51/04; H04L 51/216; H04L 51/224; G06Q 20/389; G06Q 20/42
See application file for complete search history.

(56) References Cited

U.S. PATENT DOCUMENTS

| | | | |
|---|---|---|---|
| 10,726,501 B1* | 7/2020 | Ran | G06F 7/24 |
| 2006/0173759 A1* | 8/2006 | Green | G06Q 40/00 |
| | | | 705/35 |
| 2021/0350382 A1* | 11/2021 | Lopes | G06N 3/045 |
| 2023/0103753 A1* | 4/2023 | Luo | G06F 40/40 |
| | | | 704/9 |

\* cited by examiner

*Primary Examiner* — John B Walsh
(74) *Attorney, Agent, or Firm* — Kilpatrick Townsend & Stockton LLP; Michael A. Springs, Esq.

(57) ABSTRACT

A system that can, using reduced memory and processor resources, receive a plurality of electronic messages about a common category of electronic transactions, analyze data fields of the electronic messages, and identify electronic messages that share a common marker as being related to each other and to a given electronic transaction. The system can also extract a collection of related electronic messages as a message group, ascertain the message type of each electronic message in the message group, and determine whether any electronic messages are missing from the message group based on the collection of message types present in the message group, where a missing electronic message indicates an incomplete electronic transaction. In response to determining that an electronic message is missing from the message group, the system can automatically generate a notification that identifies the incomplete electronic transaction related to the missing electronic message, and transmit the notification to a sender or receiver of the electronic messages in the message group, to notify the sender or receiver of the incomplete electronic transaction.

17 Claims, 3 Drawing Sheets

STATUS DETERMINATION OF ELECTRONIC TRANSACTIONS USING REDUCED MEMORY RESOURCES

TECHNICAL FIELD

The present disclosure relates generally to data memory resource management, and more particularly, although not exclusively, to reducing memory resources used in automatically determining the status of electronic transactions.

BACKGROUND

Electronic transaction processing can involve significant amounts of information, which may be produced and transmitted or received, in separate parts, and at various times. The information may be stored in a central location or in multiple locations. It may be required to analyze various details of the information in order to determine or confirm the status or another characteristic of electronic transactions to which the information relates. However, the number of electronic transactions and the overall volume of information to be analyzed may be substantial, and the separate parts of information may not be stored or otherwise arranged in any particular order. Consequently, analyzing the information can require a significant amount of computerized memory resources and processor power, particularly when a large number of electronic transactions are involved.

As one example, real time payment (RTP) transactions are electronic payments that are initiated and completed substantially instantaneously. RTP transactions also involve end-to-end communication, whereby electronic messages are typically exchanged between a sending entity and a receiving entity relative to each RTP transaction. A significant number of electronic messages of various types may be stored relative to a single RTP transaction, and a given information store may contain electronic messages relating to thousands of RTP transactions.

Repeatedly sorting through and analyzing potentially thousands of electronic messages to determine the status of a given electronic transaction is inefficient, and the significant memory and processing resources required to perform such sorting and analyzing operations can be expensive. Moreover, additional memory and processor resources may be required to avoid processing delays as the number of electronic transactions and associated electronic messages grows.

SUMMARY

According to one example of the present disclosure, a system may include a database, a processor communicatively coupled to the database, and memory that is communicatively coupled to the processor and includes instructions that are executable by the processor to cause the processor to perform operations. The operations may include receiving from the database, a plurality of electronic messages about a common category of electronic transactions, where each electronic message has a plurality of data fields, and at least one data field of the plurality of data fields includes an identifier to indicate a message type, and analyzing the plurality of data fields of the plurality of electronic messages. The operations may also include, in response to analyzing the plurality of data fields, identifying at least two electronic messages among the plurality of electronic messages that share a common marker as being related to each other and to a particular electronic transaction, extracting the at least two electronic messages as a message group, and determining a message type of each of the at least two electronic messages in the message group. The operations may additionally include determining, using the message type, a missing electronic message that is absent from the message group, wherein the missing electronic message is configured to indicate an incomplete electronic transaction. The operations may further include, in response to determining the missing electronic message, automatically generating a notification to identify the incomplete electronic transaction related to the missing electronic message, and transmitting the notification to a sender or receiver of the at least two electronic messages in the message group, to notify the sender or receiver of the incomplete electronic transaction.

According to another example of the present disclosure, a non-transitory computer readable medium may contain instructions that are executable by a processor to cause the processor to perform operations. The operations may include receiving from the database, a plurality of electronic messages about a common category of electronic transactions, where each electronic message has a plurality of data fields, and at least one data field of the plurality of data fields includes an identifier to indicate a message type, and analyzing the plurality of data fields of the plurality of electronic messages. The operations may also include, in response to analyzing the plurality of data fields, identifying at least two electronic messages among the plurality of electronic messages that share a common marker as being related to each other and to a particular electronic transaction, extracting the at least two electronic messages as a message group, and determining a message type of each of the at least two electronic messages in the message group. The operations may additionally include determining, using the message type, a missing electronic message that is absent from the message group, wherein the missing electronic message is configured to indicate an incomplete electronic transaction. The operations may further include, in response to determining the missing electronic message, automatically generating a notification to identify the incomplete electronic transaction related to the missing electronic message, and transmitting the notification to a sender or receiver of the at least two electronic messages in the message group, to notify the sender or receiver of the incomplete electronic transaction.

According to a further example of the present disclosure, a computer-implemented method may include receiving at a processor, from a database, a plurality of electronic messages about a common category of electronic transactions, where each electronic message has a plurality of data fields, and at least one data field of the plurality of data fields includes an identifier to indicate a message type, and analyzing, by the processor, the plurality of data fields of the plurality of electronic messages. The method may also include, in response to analyzing the plurality of data fields, identifying by the processor, at least two electronic messages among the plurality of electronic messages that share a common marker as being related to each other and to a particular electronic transaction, and extracting, by the processor, the at least two electronic messages as a message group. The method may additionally include determining, by the processor, a message type of each of the at least two electronic messages in the message group, and determining, by the processor, using the message type, a missing electronic message that is absent from the message group, wherein the missing electronic message is configured to indicate an incomplete electronic transaction. The method may further include, in response to determining the missing electronic message, automatically generating, by the processor, a notification to identify the incomplete electronic transaction related to the missing electronic message, and transmitting, by the processor, the notification to a sender or receiver of the at least two electronic messages in the message group, to notify the sender or receiver of the incomplete electronic transaction.

DETAILED DESCRIPTION

Certain aspects and examples of the present disclosure generally relate to a system for determining the status of electronic transactions using reduced memory resources. The system may receive, such as in a file from a database, a plurality of electronic messages about a common category of electronic transactions. By identifying common markers within the electronic messages, the system may extract as a message group, electronic messages that relate to each other and to a given electronic transaction. Multiple message groups relating to numerous electronic transactions may be extracted from a single file of electronic messages. By extracting related electronic messages as a message group, memory resources can be reduced because only the electronic messages in the message group need to be analyzed in order to determine the status or other characteristics of a related electronic transaction.

Determining the status of an electronic transaction by analyzing a group of related messages using reduced memory and processor resources can also result in needed corrective actions occurring more quickly. For example, a missing electronic message from a message group can indicate that an associated electronic transaction is incomplete. In such case, a system according to examples of the present disclosure can automatically generate a notification identifying the incomplete electronic transaction, and can likewise automatically transmit the notice to a sender or receiver of the missing electronic message to notify the sender or receiver of the incomplete transaction. Because the system need only analyze the electronic messages in a given message group to determine that an associated electronic transaction is incomplete, and can do so more efficiently using reduced memory and processing resources, incomplete electronic transactions can be discovered and acted upon more quickly.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

Figure 1:
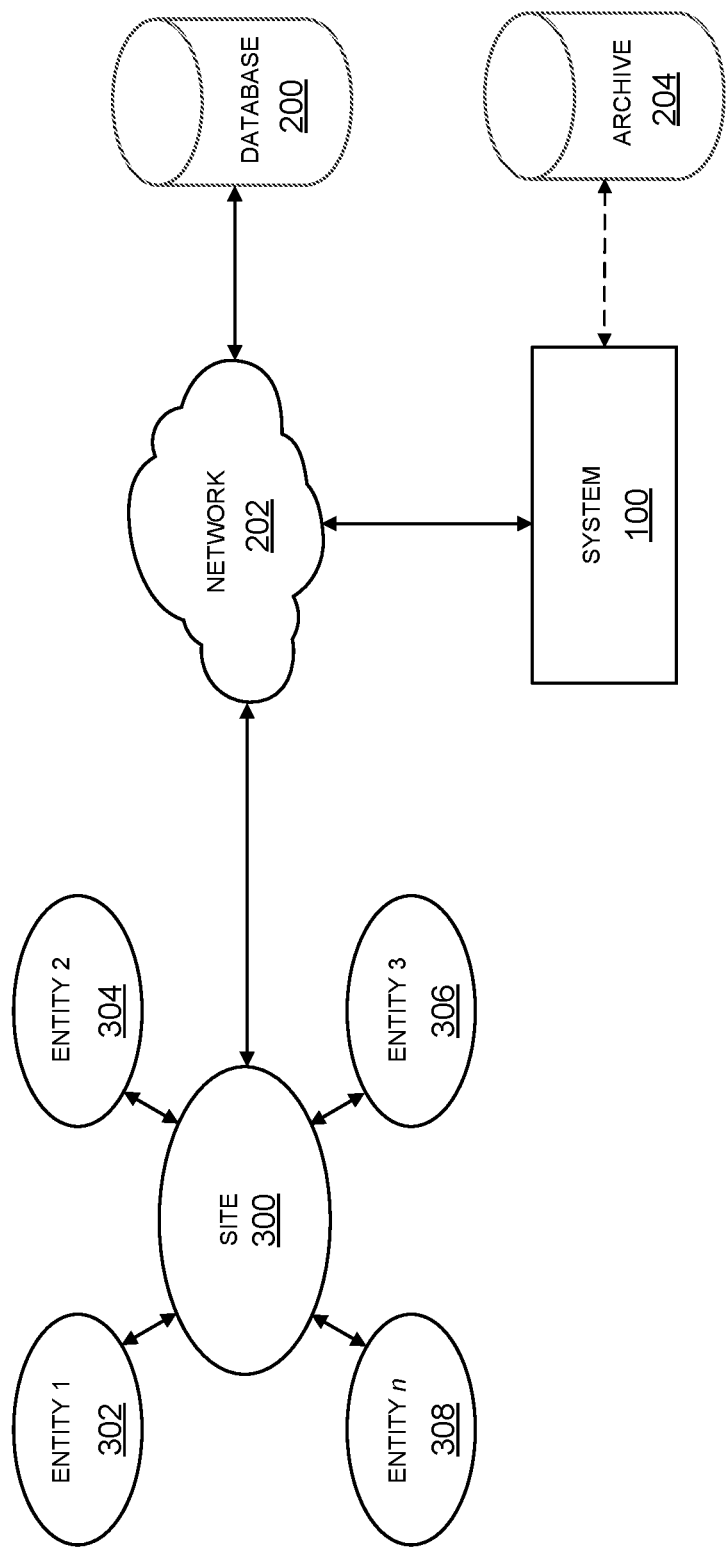
FIG. 1 is a schematic block diagram of a system for determining the status of electronic transactions using reduced memory resources, according to an example of the present disclosure.

FIG. 1 is a schematic block diagram of a system 100 for determining the status of electronic transactions using reduced memory resources, according to one example of the present disclosure. As described in more detail below, the system 100 may analyze various items of electronic information received from a database 200 having such information stored therein, group related electronic information items, determine whether any electronic information items are missing from the group and, when it is determined that an electronic information item is missing, automatically generate a notification and transmit the notification to an appropriate party or parties.

In the system 100 example of in FIG. 1, the items of electronic information to be analyzed are electronic messages related to a number of real time payment (RTP) transactions. However, the system 100 of FIG. 1 is described herein only for purposes of illustration, and other system examples according to the present disclosure may be directed to determining the status of other types of electronic information.

As represented in FIG. 1, the system 100 is in communication with the database 200, which may be in communication with a site 300 via a network 202. The site 300 represents a location or entity associated with the RTP transaction-related electronic messages to be analyzed by the system 100. The network 202 may be without limitation, a local area network (LAN), a wide-area network (WAN) such as the Internet, an institutional network, cellular or other wireless networks, virtual networks such as an intranet or an extranet, etc. The nature of the network(s) 202 utilized by the system 100 may depend on the location of the system, which may be local to or remote from the site 300.

The site 300 may be in communication with various other entities. Other entities are depicted as a first entity 302, a second entity 304, a third entity 306, and a $n^{th}$ entity 308, to represent that there is no finite limit on the number of other entities with which the site 300 may be in communication. The communications between the site 300 and the entities 302-308 are shown to be end-to-end communications, as electronic messages regarding RTP transactions may be both inbound and outbound relative to the site 300. For example, if the first entity 302 sends an electronic message initiating a RTP transaction with the site 300, the site may send an acknowledgement message to the first entity in response, and there may be a series of additional messages that are sent back-and-forth between the site 300 and the first entity 302 prior to the RTP transaction being completed.

In the provided example, the electronic messages associated with each RTP transaction processed by the site 300—whether as the initiating participant (sender) or the receiving participant (receiver)—are stored in the database 200. According to an aspect of the disclosure, the electronic messages are not saved in any particular order, hierarchy, etc. Consequently, manually analyzing and associating electronic messages stored in the database 200 would essentially amount to hand sorting through an unintelligent data dump of what could be thousands of electronic messages, and processing every message by a system each time the status of a given electronic transaction needs to be determined would consume significant memory and processor resources.

In operation, the system 100 of FIG. 1 receives from the database 200, a plurality of electronic messages about RTP transactions processed by the site 300. Each of the electronic messages includes a number of data fields, and at least one of the data fields includes an identifier to indicate a message type. For example, the message may be of a RTP transaction initiating type, of a responsive type, of an information inquiry type, and so forth.

After receiving the electronic messages, the system 100 may proceed to analyze the data fields of the electronic messages, and based on the analysis, identify electronic messages that share a common marker as being related to each other and to a given RTP transaction. The common marker may be, for example, a like reference number that appears somewhere (i.e., in at least one data field) in each of the related electronic messages. In the case of RTP transaction-related electronic messages, the reference identification number may be, for example, associated with an identifier in the original (i.e., pacs.008) RTP transaction initiating message (request).

The system 100 may then extract at least two related electronic messages as a message group. When electronic messages relating to multiple RTP transactions are present in the totality of the electronic messages received by the system 100 from the database, which will typically be the case, the system may extract a number of message groups. Once a message group has been extracted, the system 100 may determine the message type of each electronic message in the message group by reading the at least one data field in each electronic message that includes the message type identifier.

With the message type of each electronic message in the message group known, the system 100 may next determine whether any electronic messages are missing from the message group. The system 100 may be configured such that a missing electronic message indicates an incomplete RTP transaction, which may require attention.

Determining that an electronic message is missing from a message group can be accomplished by the system in several ways. According to one aspect of the present disclosure, a missing electronic message determination may be based on the ascertained overall collection of message types present in the message group. In other words, the system 100 may be configured to recognize that the presence of a particular message type in the message group should result in the presence of another particular message type in the message group. For example, a payment confirmation message from a receiver should be present in the message group if a RTP request message from a sender is present in the message group. If the payment confirmation message from the receiver is absent, the system 100 may consider the payment confirmation message to be missing from the message group and the RTP transaction to be incomplete.

According to another aspect of the present disclosure, each electronic message received by the system 100 also includes a data field that indicates a date of message transmission, and the system 100 may use the dates of message transmission to determine, or help to determine, whether an electronic message is missing from the message group. More specifically, the system 100 may compare the dates of transmission for all of the electronic messages in the message group, and identify the most recently transmitted (latest) electronic message in the message group. The system 100 may then determine whether the latest electronic message in the message group is of a type that indicates completion of the associated RTP transaction, or if a more recent electronic message should also be present in the message group. If the latest message in the message group is not of a type that indicates completion of the associated RTP transaction, the system 100 may consider the RTP transaction to be incomplete.

With respect to determining if an electronic message is missing from a message group, the system 100 may be provided with message type information, such as but not limited to, a relational lookup table or some other data set that identifies relationships between different electronic message types. For example, the system 100 may be provided with a lookup table that indicates message type B should be present in response to message type A, message type C should be present in response to message type B, etc. Optional relationships may also be indicated, such as message type D or message type E should be present in response to message type C. In any case, the system 100 may be provided with information that can be used to determine whether electronic messages are missing from a message group based on expected relationships between different electronic message types.

In response to determining that an electronic message is missing from a message group, the system 100 may automatically generate a notification that at least identifies the RTP transaction related to the missing electronic message. The notification may also identify the missing electronic message, and may provide additional information. For example, and without limitation, the notification may identify the RTP transaction related to the missing electronic message using a reference number, and may identify the missing electronic message by message type.

The system 100 may automatically transmit a generated notification to one or both of the sender and the receiver associated with the RTP transaction for which an electronic message has been determined to be missing. The transmitted notice may serve to inform the sender or the receiver that the identified RTP transaction appears to be incomplete, whereafter the applicable participant may investigate the RTP transaction and take appropriate action.

As also indicated in FIG. 1, the system 100 may be in communication with an information archive 204, such as but not limited to an archival database. When the system 100 determines that no electronic messages are missing from an extracted message group, the system 100 may consider the related RTP transaction to be a completed transaction, and may store the electronic messages, individually or as a message group, in the information archive 204.

In system examples according to the present disclosure, the RTP transaction electronic messages analyzed by the system may be of a format that complies with International Organization for Standardization (ISO) 20022. For example, and without limitation, the electronic messages may be extensible markup language (XML) messages.

Figure 2:
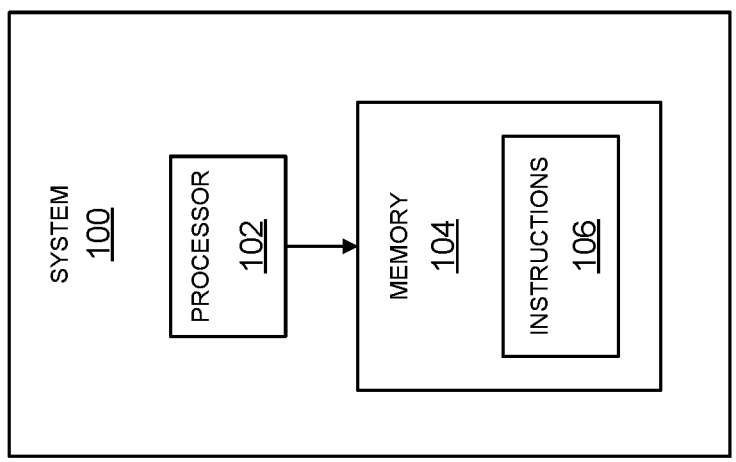
FIG. 2 is a block diagram of a system for determining the status of electronic transactions, according to one example of the present disclosure.

FIG. 2 is a block diagram depicting various components of one example of a system according to the present disclosure, such as the system 100 described above with respect to the schematic block diagram of FIG. 1. As depicted, the system 100 may include a processor 102 that is communicatively coupled to a memory 104. The processor 102 may also be communicatively coupled to a database, such as the database 200, as generally represented in FIG. 1. A database to which the processor 102 is communicatively coupled may be located remotely from the processor 102 and in communication with the processor over a network, such as but not limited to, the network 202 of FIG. 1.

The processor 102 can include one processing device or multiple processing devices. Non-limiting examples of the processor 102 include a Field-Programmable Gate Array (FPGA), an application-specific integrated circuit (ASIC), a microprocessor, etc. The processor 102 can execute instructions 106 stored in the memory 104 to perform operations. In some examples, the instructions 106 can include processor-specific instructions generated by a compiler or an interpreter from code written in a suitable computer-programming language, such as C, C++, C #, etc.

The memory 104 can include one memory or multiple memories. The memory 104 can be non-volatile and may include any type of memory that retains stored information when powered off. Non-limiting examples of the memory 104 include electrically erasable and programmable read-only memory (EEPROM), flash memory, or any other type of non-volatile memory. At least some of the memory 104 can be a non-transitory computer-readable medium from which the processor 102 can read the instructions 106. A computer-readable medium can include electronic, optical, magnetic, or other storage devices capable of providing the processor 102 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 102 can read the instructions 106.

Figure 3:
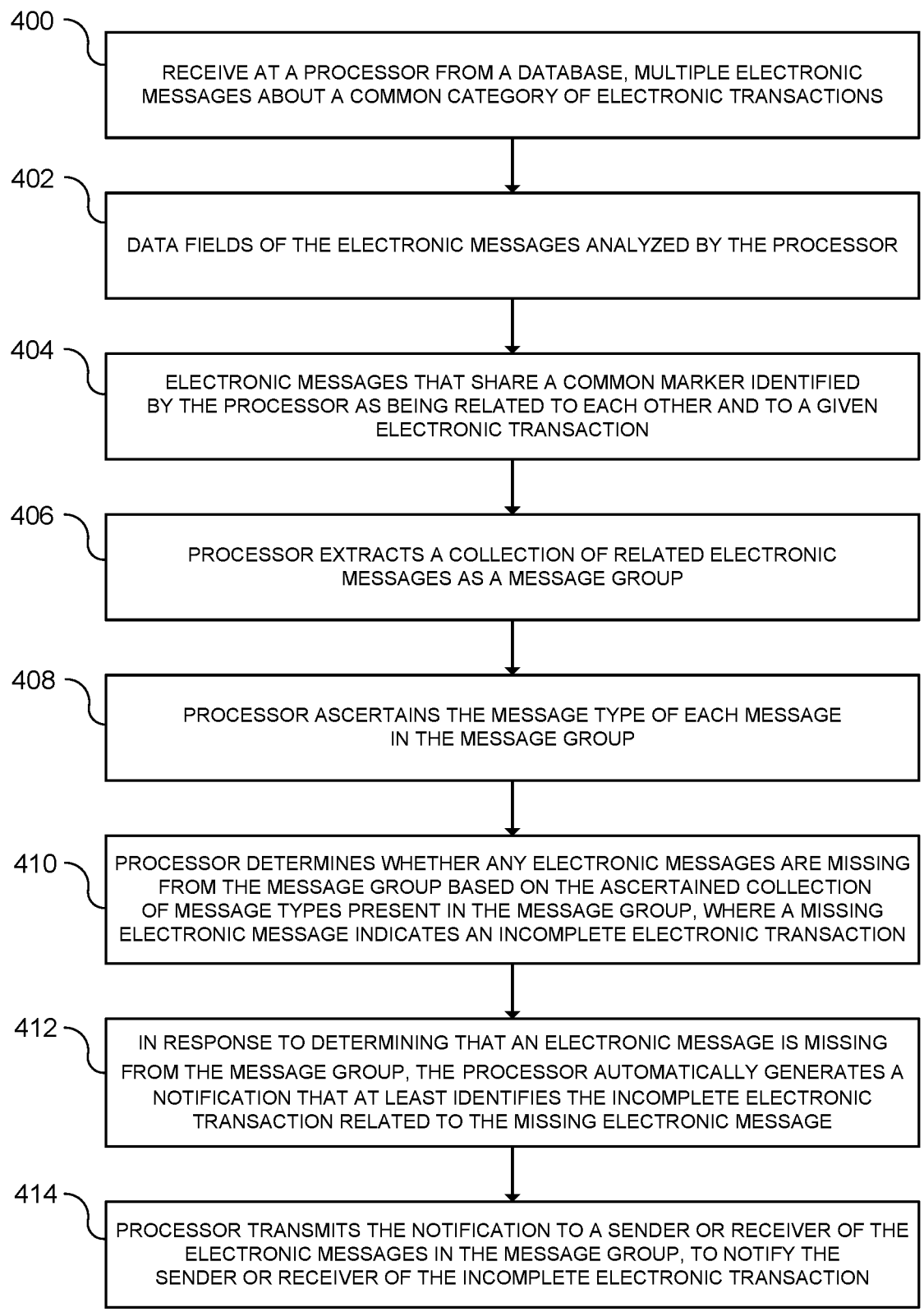
FIG. 3 is a flowchart of a method of determining the status of electronic transactions using reduced memory resources, according to one example of the present disclosure.

FIG. 3 is a flowchart illustrating a computer-implemented method of determining the status of electronic transactions using reduced memory and processor resources, according to some aspects of the present disclosure. As represented in block 400 of FIG. 3, a plurality of electronic messages about a common category of electronic transactions are received at a processor from a database. Each electronic message includes a plurality of data fields, and at least one of the data fields include an identifier that indicates a message type. At block 402, the data fields of the electronic messages are analyzed by the processor. At block 404, electronic messages that share a common marker are identified by the processor as being related to each other and to a given electronic transaction. At block 406, the processor extracts a collection of related electronic messages as a message group, and at block 408, the processor ascertains the message type of each message in the message group.

Further, at block 410, the processor determines whether any electronic messages are missing from the message group based on the ascertained collection of message types present in the message group, where a missing electronic message indicates an incomplete electronic transaction. In response to determining that an electronic message is missing from the message group, the processor at block 412, automatically generates a notification that at least identifies the incomplete electronic transaction related to the missing electronic message. At block 414, the processor transmits the notification to a sender or receiver of the electronic messages in the message group, to notify the sender or receiver of the incomplete electronic transaction.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
    a processor communicatively coupled to a database;
    memory communicatively coupled to the processor, the memory including instructions that are executable by the processor to cause the processor to:
        receive, from the database, a plurality of electronic messages about a common category of electronic transactions, each electronic message having a plurality of data fields, at least one data field of the plurality of data fields including an identifier to indicate a message type and at least one data field of the plurality of data fields indicating a date of message transmission;
        analyze the plurality of data fields of the plurality of electronic messages;
        in response to analyzing the plurality of data fields, identify at least two electronic messages among the plurality of electronic messages that share a common marker as being related to each other and to a particular electronic transaction;
        extract the at least two electronic messages as a message group;
        determine a message type of each of the at least two electronic messages in the message group;
        determine, using the message type, a missing electronic message that is absent from the message group, wherein the missing electronic message is configured to indicate an incomplete electronic transaction;
        compare the dates of transmission for the at least two electronic messages in the message group to identify the latest message of the at least two electronic messages in the message group;
        in response to identifying the latest message, determine whether the latest message is of a type that indicates completion of the related electronic transaction;
        when the latest message is not of a type that indicates completion of the related electronic transaction, designate the related electronic transaction as an incomplete transaction;
        in response to determining the missing electronic message or determining that the latest message is not of a type that indicates completion of the related electronic transaction, automatically generate a notification to identify the incomplete electronic transaction; and
        transmit the notification to a sender or receiver of the at least two electronic messages in the message group, to notify the sender or receiver of the incomplete electronic transaction.

2. The system of claim 1, wherein the common marker is a like reference number that is in a data field of the plurality of data fields of the at least two electronic messages.

3. The system of claim 1, wherein the notification further includes an identification of the missing electronic message.

4. The system of claim 1, further comprising information, accessible by the processor, that identifies relationships between different electronic message types.

5. The system of claim 1, wherein the electronic transactions are real time payment (RTP) transactions, and the electronic messages are of a format that complies with International Organization for Standardization (ISO) 20022.

6. A non-transitory computer-readable medium comprising instructions that are executable by a processor for causing the processor to:
    receive, from a database, a plurality of electronic messages about a common category of electronic transactions, each electronic message having a plurality of data fields, at least one data field of the plurality of data fields including an identifier to indicate a message type;
    analyze the plurality of data fields of the plurality of electronic messages;
    in response to analyzing the plurality of data fields, identify at least two electronic messages among the plurality of electronic messages that share a common marker as being related to each other and to a particular electronic transaction;

extract the at least two electronic messages as a message group;
determine a message type of each of the at least two electronic messages in the message group;
determine, using the message type, a missing electronic message that is absent from the message group, wherein the missing electronic message is configured to indicate an incomplete electronic transaction;
compare the dates of transmission for the at least two electronic messages in the message group to identify the latest message of the at least two electronic messages in the message group;
in response to identifying the latest message, determine whether the latest message is of a type that indicates completion of the related electronic transaction;
when the latest message is not of a type that indicates completion of the related electronic transaction, designate the related electronic transaction as an incomplete transaction;
in response to determining the missing electronic message or determining that the latest message is not of a type that indicates completion of the related electronic transaction, automatically generate a notification to identify the incomplete electronic transaction; and
transmit the notification to a sender or receiver of the at least two electronic messages in the message group, to notify the sender or receiver of the incomplete electronic transaction.

7. The non-transitory computer-readable medium of claim 6, wherein the common marker is a like reference number that is in a data field of the plurality of data fields of the at least two electronic messages.

8. The non-transitory computer-readable medium of claim 6, further comprising information, accessible by the processor, that identifies relationships between different electronic message types.

9. The non-transitory computer-readable medium of claim 6, wherein the electronic transactions are real time payment (RTP) transactions, and the electronic messages are of a format that complies with International Organization of Standardization (ISO) 20022.

10. A computer-implemented method comprising:
receiving at a processor, from a database, a plurality of electronic messages about a common category of electronic transactions, each electronic message having a plurality of data fields, at least one data field of the plurality of data fields including an identifier to indicate a message type;
analyzing, by the processor, the plurality of data fields of the plurality of electronic messages;
in response to analyzing the plurality of data fields, identifying by the processor, at least two electronic messages among the plurality of electronic messages that share a common marker as being related to each other and to a particular electronic transaction;
extracting, by the processor, the at least two electronic messages as a message group;
determining, by the processor, a message type of each of the at least two electronic messages in the message group;
determining, by the processor, using the message type, a missing electronic message that is absent from the message group, wherein the absence of the missing electronic message indicates an incomplete electronic transaction;
comparing, by the processor, the dates of transmission for the at least two electronic messages in the message group to identify the latest message of the at least two electronic messages in the message group;
in response to identifying the latest message, determining, by the processor, whether the latest message is of a type that indicates completion of the related electronic transaction;
when the latest message is not of a type that indicates completion of the related electronic transaction, designate the related electronic transaction as an incomplete transaction;
in response to determining the missing electronic message or determining that the latest message is not of a type that indicates completion of the related electronic transaction, automatically generating, by the processor, a notification to identify the incomplete electronic transaction; and
transmitting, by the processor, the notification to a sender or receiver of the at least two electronic messages in the message group, to notify the sender or receiver of the incomplete electronic transaction.

11. The method of claim 10, wherein the common marker is a like reference number that is in a data field of the plurality of data fields of the at least two electronic messages.

12. The method of claim 10, wherein the missing electronic message is also identified in the notification.

13. The method of claim 10, further comprising saving, by the processor, extracted message group(s) data as a file.

14. The method of claim 13, wherein the file is an extensible markup language (XML) file.

15. The method of claim 10, wherein an electronic transaction associated with a message group having no missing electronic messages is identified by the processor as being a completed transaction, and the processor stores the message group in an archive.

16. The method of claim 10, further comprising accessing, by the processor, information that identifies relationships between different electronic message types, and using the information that identifies relationships between different electronic message types when determining a missing electronic message that is absent from the message group.

17. The method of claim 10, wherein the electronic transactions are real time payment (RTP) transactions, and the electronic messages are of a format that complies with International Organization for Standardization (ISO) 20022.

* * * * *